United States Patent
Ozaki et al.

(10) Patent No.: US 6,833,874 B2
(45) Date of Patent: Dec. 21, 2004

(54) TICKER TAPE PICTURE-IN-PICTURE SYSTEM

(75) Inventors: Arthur H. Ozaki, Escondido, CA (US); Roy J. Steward, San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 490 days.

(21) Appl. No.: 09/819,250

(22) Filed: Mar. 27, 2001

(65) Prior Publication Data

US 2002/0140860 A1 Oct. 3, 2002

(51) Int. Cl.⁷ ............................ H04N 5/45; H04N 5/445
(52) U.S. Cl. ........................ 348/565; 348/564; 348/584; 348/599; 345/604
(58) Field of Search ................................ 348/565, 564, 348/563, 566, 567, 569, 468, 473, 474, 584, 588, 589, 590, 591, 592, 598–9; 345/603, 604; 725/137; H04N 5/445, 5/45

(56) References Cited

U.S. PATENT DOCUMENTS

| | | | | |
|---|---|---|---|---|
| 5,422,677 A | * | 6/1995 | Do ............................... | 348/568 |
| 5,442,406 A | * | 8/1995 | Altmanshofer et al. ...... | 348/588 |
| 5,543,857 A | * | 8/1996 | Wehmeyer et al. .......... | 348/589 |
| 5,557,338 A | * | 9/1996 | Maze et al. ................... | 725/38 |
| 5,565,929 A | * | 10/1996 | Tanaka ......................... | 348/565 |
| 5,602,598 A | * | 2/1997 | Shintani ....................... | 348/565 |
| 5,671,019 A | * | 9/1997 | Isoe et al. ..................... | 348/565 |
| 5,675,389 A | * | 10/1997 | Oda .............................. | 348/468 |
| 5,708,475 A | * | 1/1998 | Hayashi et al. ............... | 348/468 |
| 5,815,216 A | * | 9/1998 | Suh .............................. | 348/588 |
| 5,946,046 A | * | 8/1999 | You et al. ..................... | 348/468 |
| 5,963,270 A | * | 10/1999 | Hwang ......................... | 348/588 |
| 5,978,046 A | * | 11/1999 | Shintani ....................... | 348/589 |
| 5,995,160 A | * | 11/1999 | Rumreich ..................... | 348/564 |
| 5,999,207 A | * | 12/1999 | Rodriguez et al. ........... | 348/14.03 |
| 6,061,099 A | * | 5/2000 | Hostetler ...................... | 348/584 |
| 6,141,058 A | * | 10/2000 | Lagoni et al. ................ | 348/563 |
| 6,175,387 B1 | * | 1/2001 | Han .............................. | 348/565 |
| 6,210,170 B1 | * | 4/2001 | Sorensen et al. ............. | 434/323 |
| 6,226,047 B1 | * | 5/2001 | Ryu .............................. | 348/569 |
| 6,268,887 B1 | * | 7/2001 | Watanabe et al. ............ | 348/554 |
| 6,308,329 B1 | * | 10/2001 | Takahashi .................... | 725/153 |
| 6,384,868 B1 | * | 5/2002 | Oguma ......................... | 348/564 |
| 6,421,094 B1 | * | 7/2002 | Han .............................. | 348/569 |
| 6,459,906 B1 | * | 10/2002 | Yang ............................ | 455/556.1 |
| 6,493,038 B1 | * | 12/2002 | Singh et al. .................. | 348/565 |
| 6,510,553 B1 | * | 1/2003 | Hazra ............................ | 725/87 |
| 6,532,041 B1 | * | 3/2003 | Monta et al. ................. | 348/468 |
| 6,556,252 B1 | * | 4/2003 | Kim .............................. | 348/565 |
| 6,603,517 B1 | * | 8/2003 | Shen et al. .................... | 348/565 |
| 6,621,526 B1 | * | 9/2003 | Yamagishi .................... | 348/659 |

(List continued on next page.)

Primary Examiner—Brian P. Yenke
(74) Attorney, Agent, or Firm—Charles J. Kulas, Carpenter & Kulas, LLP

(57) ABSTRACT

A ticker tape PiP system that provides for viewing the ticker tape image portion from one image signal (e.g., a ticker tape image portion of a television image signal), while viewing at least a portion of an image from a different image signal (i.e., a standard television program image). The ticker tape PiP system includes an image display device, a first tuner and a second tuner. The first and second tuners are configured to receive first and second image signals and to output corresponding first and second video signals, respectively. The ticker tape PiP system also includes a video switching subsystem for receiving the first and second video signals and for selectively switching an output to the image display device between (i) an RGB formatted display signal derived from the first video signal and (ii) an RGB formatted display signal derived from the second video signal that corresponds only to a ticker tape image portion of the second video signal. The selective switching of the video switching subsystem is based on a timing signal supplied by a microprocessor.

4 Claims, 2 Drawing Sheets

U.S. PATENT DOCUMENTS

| | | | |
|---|---|---|---|
| 6,661,467 B1 * | 12/2003 | Van Der Meer et al. | 348/564 |
| 6,674,481 B1 * | 1/2004 | Umemura et al. | 348/461 |
| 6,678,006 B1 * | 1/2004 | Velez et al. | 348/564 |
| 2002/0033899 A1 * | 3/2002 | Oguma | 348/565 |
| 2002/0057372 A1 * | 5/2002 | Cavallerano et al. | 348/565 |
| 2002/0104081 A1 * | 8/2002 | Candelore et al. | 725/9 |
| 2002/0181936 A1 * | 12/2002 | Yuen et al. | 386/83 |
| 2003/0016304 A1 * | 1/2003 | Norsworthy et al. | 348/565 |
| 2003/0020832 A1 * | 1/2003 | Carlsgaard et al. | 348/565 |

\* cited by examiner

TICKER TAPE PICTURE-IN-PICTURE SYSTEM

BACKGROUND OF THE INVENTION

1. Field of the Invention

The present invention relates in general to television systems and, in particular, to television systems that can simultaneously display more than one image.

2. Description of the Related Art

Today's conventional television systems are frequently capable of simultaneously displaying multiple images originating from different image signals (i.e., different channels). In these television systems, commonly referred to as picture-in-picture (PiP) systems, one or more of the images (the "sub-images") are reduced in size and displayed within or alongside the other image (the "main image"). Conventional PiP systems require the use of expensive and complex circuits to sample, digitize, compress and insert an image signal corresponding to the sub-image(s) into an image signal corresponding to the main image.

A number of television channels broadcast an image signal that includes a moving "ticker tape" image portion, which is essentially a continuously moving banner image. Popular uses of such a ticker tape image portion include displaying stock prices, a news flash, sport scores or weather information along the bottom of a television screen. Systems for independently generating and displaying a ticker tape image are known. A drawback of conventional PiP systems, however, is that they do not provide for viewing only the ticker tape image portion from one image signal (i.e., one channel) in essentially its original size, format and display area location, while viewing an image from a different image signal (i.e., another channel). In other words, the conventional PiP systems do not allow a user to just view the ticker tape image from one channel, while viewing a program from a different channel.

Still needed in the field, therefore, is a ticker tape PiP system that provides for viewing the ticker tape image portion from one image signal while viewing an image from a different image signal. In addition, the ticker tape PiP system should be relatively inexpensive and simple.

BRIEF SUMMARY OF THE INVENTION

The present invention includes a ticker tape PiP system that provides for viewing the ticker tape image portion from one image signal, while viewing at least a portion of another image from a different image signal. For example, the ticker tape PiP system according to one exemplary embodiment of the present invention enables a user to just view the ticker tape news flash of CNN (i.e., a ticker tape image portion originating from CNN), while viewing another television program of CBS (i.e., a different image signal originating from CBS). The ticker tape image portion can, for instance, be displayed in its original size, format and display area location, typically at the bottom of a television cathode ray tube's (CRT's) display area, while the other image is displayed in the remainder of the CRT's display area. The ticker tape PiP system does not require the use of expensive and complex circuits to sample, digitize or compress either of the image signals and is, therefore, relatively inexpensive and simple.

One exemplary embodiment of a ticker tape PiP system according to the present invention includes an image display device (e.g., a television CRT), a first tuner and a second tuner. The first tuner is configured to receive a first image signal (e.g., an RF image signal) corresponding to a first image and to output a corresponding first video formatted signal. The second tuner is configured to receive a second image signal corresponding to a second image that includes a ticker tape image portion, as well as to output a corresponding second video formatted signal.

This exemplary embodiment of a ticker tape PiP system according to the present invention also includes a video switching subsystem for receiving the first and second video formatted signals and for selectively switching an output to the image display device between Red-Green-Blue (RGB) formatted display signals derived from the first video formatted signal and from the second video formatted signal. The ticker tape PiP system also includes a microprocessor for sending a timing signal to the video switching subsystem to control the selective switching. This timing signal controls the selective switching of the video switching subsystem in such a manner that the image display device sequentially receives an RGB formatted display signal corresponding to a predetermined portion of the first image and an RGB formatted display signal corresponding to just the ticker tape image portion of the second image. In this regard, it should be noted that the predetermined portion of the first image is essentially that portion of the first image unblocked by the presence of the ticker tape image portion. Operation of the ticker tape PiP system, therefore, provides for the image display device to simultaneously display the ticker tape image portion and the predetermined portion of the first image to a user. One skilled in the art will recognize that ticker tape PiP systems according to the present invention are suitable for use in, for example, a television receiver apparatus.

A better understanding of the features and advantages of the present invention will be obtained by reference to the following detailed description that sets forth illustrative embodiments, in which the principles of the invention are utilized, and the accompanying drawings (in which like numerals are used to designate like elements).

DETAILED DESCRIPTION OF THE INVENTION

Figure 1:
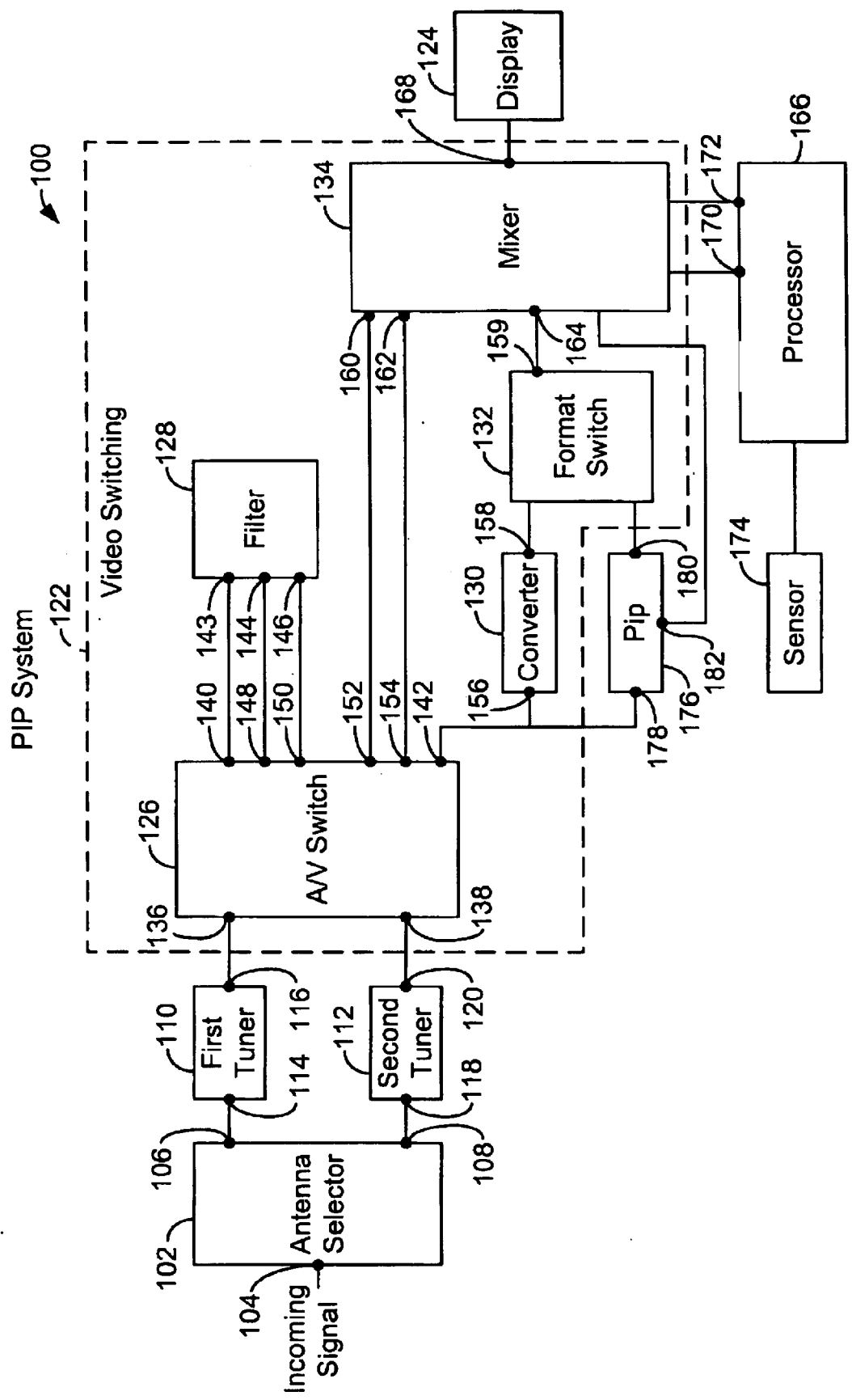
FIG. 1 is a block diagram of an exemplary ticker tape PiP system in accordance with the present invention.

FIG. 1 is a block diagram illustrating an exemplary ticker tape picture-in-picture (PiP) system 100 according to the present invention. Ticker tape PiP system 100 includes an antenna selector 102 (e.g., a Sony AS-2F antenna selector or other suitable antenna selector known in the art). Antenna selector 102 is configured to receive an incoming signal at terminal 104, split the incoming signal and send the incoming signal to terminals 106, 108.

One skilled in the art will recognize that the incoming signal received at terminal 104 carries multiple image signals corresponding to, for example, multiple television broadcast channels. The incoming signal can be, for example, a radio frequency (RF) signal or a cable television signal. At least one of the multiple image signals carried by the incoming signal includes a ticker tape image portion. Such a ticker tape image portion has been mixed into the image signal prior to the image signal being broadcast.

Ticker tape PiP system 100 also includes a first tuner 110 and a second tuner 112. First tuner 110 is configured to receive a first image signal at terminal 114 that corresponds to a first image. First tuner 110 demodulates the first image signal and outputs a corresponding first video formatted signal (which includes video and audio components) at terminal 116. Second tuner 112 is configured to receive a second image signal (corresponding to a second image that includes a ticker tape image portion) at terminal 118, demodulate the second image signal and output a corresponding second video formatted signal (including video and audio components) at terminal 120. First tuner 110 and second tuner 112 can be any suitable tuner known to one skilled in the art. For example, first tuner 110 and second tuner 112 can be Sony WA-412 and Sony FA-402 tuners, respectively.

Ticker tape PiP system 100 also includes a video switching subsystem 122 (delineated by a dashed line in FIG. 1) and image display device 124 (e.g., a television CRT). As is explained in detail below, video switching subsystem 122 is configured to receive the first video formatted signal and the second video formatted signal. Video switching subsystem 122 is also configured to selectively switch between outputting (to image display device 124) an RGB formatted display signal derived from a portion of the first video formatted signal and an RGB formatted display signal derived from just the ticker tape image portion of the second video formatted signal. Since image display device 124 receives a selectively switched RGB formatted display signal, it displays a portion of the first image in a first display area 200 (see FIG. 2), while displaying the ticker tape image portion of the second image in a second display area 202 (see FIG. 2).

Video switching subsystem 122 includes an audio/video (A/V) switch 126, a comb filter 128, a Video-to-YUV (V-to-YUV) format converter 130, a YUV format switch 132 and a video mixer/switch 134. A/V switch 126 is configured to stitch the audio and video components of the first and second video formatted signals (received at terminals 136 and 138, respectively) and output stitched first and second video signals at terminals 140 and 142, respectively. A/V switch 126 can be any suitable A/V switch known to one skilled in the art, for example, a Sony CXA1845 A/V switch.

Comb filter 128 is configured to receive the stitched first video signal at terminal 143 and convert the stitched first video signal to a Y (brightness) formatted signal and a C (color) formatted signal. Comb filter 128 is also configured to output the Y formatted signal at terminal 144 and the C formatted signal at terminal 146. The Y formatted signal and C formatted signal are received at terminals 148 and 150 of A/V switch 126, which outputs these Y and C formatted signals at terminals 152 and 154, respectively. Comb filter 128 can be, for example, an NEC uPD64082GF comb filter.

The stitched second video signal is received at terminal 156 of V-to-YUV format converter 130. V-to-YUV format converter 130 is configured to convert the stitched second video signal to a YUV formatted signal. The YUV formatted signal is output to YUV format switch 132 at terminal 158 of V-to-YUV format converter 130. The YUV formatted signal is then switched through YUV format switch 132 for output at terminal 159.

Video mixer/switch 134 is configured to receive the aforementioned Y formatted signal, C formatted signal and YUV formatted signal at terminals 160, 162 and 164, respectively. Video mixer/switch 134 is also configured to selectively and sequentially convert either of the Y and C formatted signals and the YUV formatted signal into an RGB formatted signal. Such a conversion is accomplished by selectively switching between (i) the Y and C formatted signals and (ii) the YUV formatted signal based on a timing signal received from a microprocessor 166 (described below). The RGB formatted display signal is then output to image display device 124 at terminal 168 of video mixer/switch 134. Video mixer/switch 134 can be a Sony CXA2131 YC-Jungle mixer/switch or any other suitable video mixer/switch known to one skilled in the art.

By selectively switching between the Y and C formatted signals (which are derived from the first video signal) and the YUV formatted signal (which is derived from the second video signal that includes a ticker tape image portion), video mixer/switch 134 essentially blanks out a portion of the first image and substitutes the ticker tape image portion of the second image.

Ticker tape PiP system 100 also includes a microprocessor 166 (e.g., a Mitsubishi M306V5 microprocessor) configured to send the aforementioned timing signal to video mixer/switch 134 via terminal 170 and an H/V signal via terminal 172. The timing signal causes video switching subsystem 122 to selectively switch between outputting an RGB formatted display signal derived from the first video signal (namely the Y and C formatted signals) and an RGB formatted display signal derived from the second video signal (namely the YUV formatted signal). As a result of this selective switching, image display device 124 sequentially receives an RGB formatted display signal corresponding to a predetermined portion of the first image and an RGB formatted display signal corresponding only to the ticker tape image portion of the second image. Ticker tape PiP system 100 is, thus, able to provide for the simultaneous viewing of just the ticker tape image portion of the second video signal and a predetermined portion of the first image from the first video signal. In essence, the image display device switches between displaying the first image and the ticker tape image portion of the second image based on the timing signal. The timing signal can, for example, be dependent on the scanning position of the CRT in first display area 200 and second display area 202 of FIG. 2.

Figure 2:
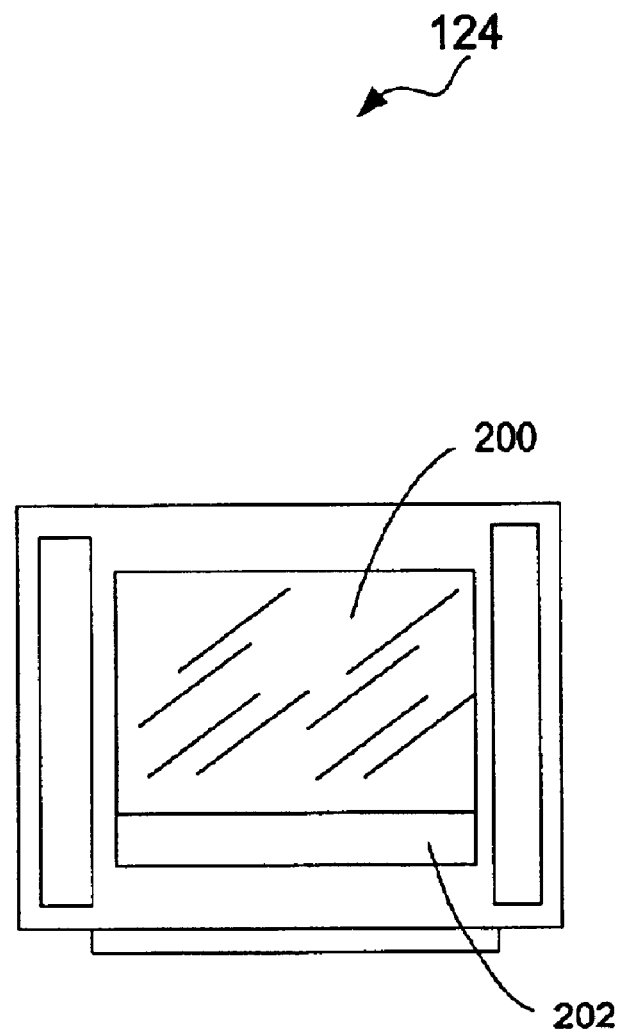
FIG. 2 is a drawing illustrating exemplary display areas of an image display device included in a ticker tape PiP system in accordance with the present invention.

Ticker tape PiP system 100 also includes a remote sensor unit 174 configured to receive an IR signal from a remote control device (not shown) and convert that IR signal to an electronic signal for output to microprocessor 166. The remote sensor unit 174 can be, for example, a Sony SBX3071 remote sensor. The remote sensor unit and remote control device are configured to allow a user to select a second video formatted signal (i.e., a channel such as CNN or ESPN) that contains the desired ticker tape image portion for display and a different first video formatted signal that contains another image for simultaneous display. The remote sensor unit and remote control device are also configured to enable a user to adjust the heights of first display area 200 and second display area 202, as illustrated in FIG. 2, to accommodate diverse ticker tape image portion sizes.

Ticker tape PiP systems in accordance with the present invention do not require the use of complex and expensive circuits to sample, digitize and shrink/compress the ticker tape image portion of the second image. Ticker tape PiP systems according to the present invention are, therefore, relatively inexpensive and simple in comparison to conventional PiP systems.

Ticker tape PiP system 100 also provides conventional PiP capability by employing a conventional PiP circuit 176

(e.g., an Infineon SDA9588 PiP processor or other suitable PiP circuit known in the art that can perform the required sampling, digitizing and compression operations), as illustrated in FIG. 1. PiP circuit 176 is configured to receive the stitched second video signal at terminal 178, output a YUV formatted signal at terminal 180 and output a YS mixing signal at terminal 182. If a conventional PiP image is desired by a user, video mixer/switch 134 will combine the YUV formatted signal from PiP circuit 176 with the Y and C formatted signals from A/V switch 126 based on the YS mixing signal to produce a combined RGB formatted display signal for output at terminal 168. The combined RGB signal provides the desired conventional PiP image on image display device 124.

It should be understood that various alternatives to the embodiments of the invention described herein may be employed in practicing the invention. For example, although the invention has been discussed with respect to component video signals, a composite video signal such as PAL or NTSC can be used. Also, digital forms of video can be adapted for use with the invention.

Note that video switching subsystem 122 need not be local to image display device 124. One application is where the video switching to achieve a signal including information from multiple video sources is performed at a remote location such as a broadcast station, central video feed, etc., so that the signal generated at terminal 168 can then be output to display devices, such as television receivers, computer monitors, etc., as desired.

Any number of video signal sources can be used. The signal sources need not be of the same type. Where video signal sources are not the same type, then translation or conversion of one or more of the signals can be used to achieve an output signal, as desired.

It is intended that the following claims define the scope of the invention and that structures within the scope of these claims and their equivalents be covered thereby.

What is claimed is:

1. A ticker tape picture-in-picture (PiP) system comprising:

an image display device;

a first tuner for receiving a first image signal corresponding to a first image and outputting a first video formatted signal corresponding thereto;

a second tuner for receiving a second image signal corresponding to a second image, the second image including a ticker tape image portion, and outputting a second video formatted signal corresponding thereto;

a video switching subsystem for receiving the first video formatted signal and the second video formatted signal and selectively outputting to the image display device an RGB formatted display signal derived from one of the first video signal and the second video signal;

a microprocessor for sending a timing signal to the video switching subsystem, the timing signal causing the video switching subsystem to selectively switch between outputting an RGB formatted display signal derived from the first video signal and an RGB formatted display signal derived from the second video signal in such a manner that the image display device sequentially receives an RGB formatted display signal corresponding to a predetermined portion of the first image and an RGB formatted display signal corresponding to the ticker tape image portion of the second image;

wherein the first and second video signals include audio and video components and wherein the video switcher subsystem includes:

an audio/video switch configured to receive the first and second video signals from the first and second tuners, respectively, to stitch audio and video components of the first and second video signals, and to output a stitched first video signal, a stitched second video signal, a Y formatted signal and a C formatted signal;

a V-to-YUV format converter configured to convert the stitched second video signal to a YUV formatted signal; and a video mixer/switch configured to receive the Y formatted signal, the C formatted signal and the YUV formatted signal and to selectively and sequentially convert the Y and C formatted signals and the YUV formatted signal into an RGB formatted display signal.

2. The ticker tape picture-in-picture system of claim 1 further comprising a PiP circuit configured to receive the stitched second video signal and to output a corresponding YUV formatted signal to the video mixer/switch.

3. A video switching subsystem comprising first and second inputs for receiving first and second video signals, respectively, wherein the first and second video signals include audio and video components;

a timing signal generator for generating a timing signal to selectively switch between outputting an RGB formatted display signal derived from the first video signal and an RGB formatted display signal derived from the second video signal in such a manner that the image display device sequentially receives an RGB formatted display signal corresponding to a predetermined portion of the first image and an RGB formatted display signal corresponding to the ticker tape image portion of the second image;

an audio/video switch configured to receive the first and second video signals to stitch audio and video components of the first and second video signals and to output a stitched first video signal, a stitched second video signal, a Y formatted signal and a C formatted signal;

a V-to-YUV format converter configured to convert the stitched second video signal to a YUV formatted signal; and a video mixer/switch configured to receive the Y formatted signal, the C formatted signal and the YUV formatted signal and to selectively and sequentially convert the Y and C formatted signals and the YUV formatted signal into an RGB formatted display signal.

4. The video switching subsystem of claim 3, further comprising a picture-in-picture circuit configured to receive the stitched second video signal and to output a corresponding YUV formatted signal to the video mixer/switch.

* * * * *